United States Patent [19]

Clenet

[11] Patent Number: 4,923,244
[45] Date of Patent: May 8, 1990

[54] TRANSPARENT VEHICLE ROOF HAVING SUNSHADE

[75] Inventor: Alain J-M. Clenet, Santa Barbara, Calif.

[73] Assignee: ASHA Corporation, Santa Barbara, Calif.

[21] Appl. No.: 313,795

[22] Filed: Feb. 22, 1989

Related U.S. Application Data

[63] Continuation-in-part of Ser. No. 220,785, Jul. 18, 1988.

[51] Int. Cl.$^5$ .............................................. B60J 7/00
[52] U.S. Cl. .................................... 296/214; 296/215; 296/97.8; 160/37
[58] Field of Search ................ 296/211, 214, 215, 219, 296/220, 97.8; 160/32, 35, 37

[56] References Cited

U.S. PATENT DOCUMENTS

| | | |
|---|---|---|
| 817,562 | 4/1906 | Holden . |
| 1,393,405 | 10/1921 | Soteros et al. . |
| 1,425,484 | 8/1922 | Jenkins . |
| 1,427,038 | 8/1922 | Toadvine . |
| 1,441,501 | 1/1923 | Hein . |
| 1,455,475 | 5/1923 | Bullock . |
| 1,637,763 | 8/1927 | Clegg . |
| 1,835,405 | 12/1931 | Kaplan et al. ........................ 296/219 |
| 1,839,727 | 1/1932 | Austin ................................. 296/219 |
| 1,860,463 | 5/1932 | Kaplan ................................. 296/219 |
| 2,248,538 | 7/1941 | Liebler ................................. 296/98 |
| 2,328,263 | 8/1943 | DeStefano . |
| 2,561,188 | 7/1951 | Ferguson . |
| 2,580,776 | 1/1952 | Herman . |
| 2,723,714 | 11/1955 | Moore . |
| 2,855,241 | 10/1958 | Walter . |
| 2,861,836 | 11/1958 | Goeggel ................................ 296/219 |
| 2,874,770 | 2/1959 | Rohr et al. . |
| 2,921,628 | 1/1960 | Alvarez ................................ 160/201 |
| 2,927,819 | 3/1960 | Johnson . |
| 2,973,990 | 3/1961 | Werner . |
| 3,183,033 | 5/1965 | Stulbach . |
| 3,363,666 | 1/1968 | Hodgson et al. . |
| 3,412,506 | 11/1968 | Shiota ................................... 49/82 |
| 3,584,910 | 6/1971 | Lupel . |
| 3,658,378 | 4/1972 | Sutren ................................. 296/219 |
| 3,964,784 | 6/1976 | Prechter et al. .................... 49/372 X |
| 4,018,476 | 4/1977 | Lutz et al. ........................... 49/63 X |
| 4,157,845 | 6/1979 | Queveau ............................. 296/220 |
| 4,175,784 | 11/1979 | Schatzler et al. . |
| 4,220,189 | 9/1980 | Marquez ......................... 160/269 X |
| 4,274,672 | 6/1981 | Kuroda ............................... 296/216 |
| 4,312,533 | 1/1982 | Jardin et al. ....................... 296/214 |
| 4,320,921 | 3/1982 | Schatzler ........................... 296/213 |
| 4,335,773 | 6/1982 | Masi . |
| 4,337,975 | 7/1982 | Tamamushi et al. ............. 296/215 |

(List continued on next page.)

FOREIGN PATENT DOCUMENTS

| | | | |
|---|---|---|---|
| 132091 | 2/1933 | Fed. Rep. of Germany ...... | 296/219 |
| 3427772 | 2/1986 | Fed. Rep. of Germany ...... | 296/211 |
| 4627 | 1/1983 | Japan .................................. | 296/215 |
| 2202806 | 10/1988 | United Kingdom ............... | 296/214 |

Primary Examiner—Dennis H. Pedder
Attorney, Agent, or Firm—Brooks & Kushman

[57] ABSTRACT

A vehicle sunshade roof construction (16) is disclosed as including a transparent roof panel (28) and a sunshade (32) for opening and closing the area below the transparent roof panel. The sunshade includes a plurality of laterally elongated blades (34) connected by a flexible sheet-like shade (38) and utilized in association with a pair of roof mounted guides (40) that support the sunshade for movement between the closed and open positions. In the closed position, the blades (34) are spaced with the shade (38) extending therebetween; and in the open position, the blades (34) are stored in a stacked relationship with the shade (38) folded therebetween at a location that exposes the occupant compartment to the transparent roof panel (28). A power operated drive mechanism (42) is preferably provided for moving the sunshade between the closed and open positions and utilizes flexible drive tapes (48) and ramps (64) that make and uncouple connections (50) between the drive tapes and the sunshade blade ends (36). Different embodiments of the sunshade blades (34, 34a, 34b, 34a', 34b') and the power operated drive mechanism (42, 42', 42''') are disclosed.

32 Claims, 17 Drawing Sheets

U.S. PATENT DOCUMENTS

| | | | |
|---|---|---|---|
| 4,420,184 | 12/1983 | Kaltz | 296/221 |
| 4,428,412 | 1/1984 | Toro. | |
| 4,458,739 | 7/1984 | Murray et al. | 160/269 X |
| 4,558,899 | 12/1985 | Chu et al. . | |
| 4,597,430 | 1/1986 | Marquez | 160/269 |
| 4,610,292 | 9/1986 | Hausmann et al. | 160/120 |
| 4,638,844 | 1/1987 | Hayashiguchi . | |
| 4,647,102 | 3/1987 | Ebrahimzadeh . | |
| 4,671,564 | 6/1987 | Sumida et al. | 296/214 |
| 4,674,789 | 6/1987 | Watjer et al. . | |
| 4,679,846 | 7/1987 | Lux et al. | 296/214 |
| 4,695,090 | 9/1987 | Draper | 296/216 |
| 4,702,297 | 10/1987 | Van Klompenburg | 160/271 |
| 4,702,518 | 10/1987 | Paerisch et al. | 296/217 |
| 4,707,018 | 11/1987 | Gavagan . | |
| 4,717,200 | 1/1988 | Kruger | 296/214 |

TRANSPARENT VEHICLE ROOF HAVING SUNSHADE

CROSS REFERENCE TO RELATED APPLICATION

This application is a continuation-in-part of prior application Ser. No. 220,785 filed by Alain J-M Clenet on Jul. 18, 1988 under the title "Transparent Vehicle Roof Having Sunshade".

TECHNICAL FIELD

This invention relates to a sunshade roof construction for a vehicle including a transparent roof panel.

BACKGROUND ART

Vehicle bodies having a roof opening or other opening that is selectively closed and opened by a plurality of interconnected panels are disclosed by U.S. Pat. Nos.: 817,562; 2,248,538; 2,973,990; and 4,157,845.

As disclosed by U.S. Pat. No. 4,695,090, the prior art also includes a vehicle roof opening that is selectively closed and opened by an an externally retractable sunroof assembly that extends laterally in the closed position between upper edges of associated vehicle side doors with a door-to-door construction.

Conventional vehicle sunroofs are mounted within a roof opening that is located between side rails of the vehicle body roof and have previously included sunshades that enable the sunroof panel to be transparent so that the environment can be viewed from the occupant compartment while still providing shading from the sun when necessary. See, for example, U.S. Pat. Nos.: 3,964,784; 4,018,476; 4,175,784; 4,274,672; 4,312,533; 4,320,921; 4,337,975; 4,671,564; 4,679,846; 4,702,518; and 4,717,200. Such sunshades are generally planar and limit the size roof opening which can be shaded or opened for viewing.

Other vehicle sunshades, sunshields, and antiglare shields that are primarily utilized with vehicle windshields, side windows, or back windows are disclosed by U.S. Pat. Nos.: 1,427,038; 1,441,501; 1,455,475; 1,637,763; 2,328,263; 2,561,188; 2,723,714; 2,855,241; 2,874,770; 2,927,819; 3,183,033; 3,363,666; 3,412,506; 3,584,910; 4,335,773; 4,428,412; 4,558,899; 4,647,102; 4,707,018; and 4,674,789.

Architectural window sunshades having edges which are guided during movement between open and closed positions are disclosed by U.S. Pat. Nos.: 1,393,405; 1,425,484; 2,580,776; 2,921,628; 4,220,189; 4,458,739; 4,597,430; 4,610,292; 4,638,844; and 4,702,297.

DISCLOSURE OF INVENTION

An object of the present invention is to provide an improved sunshade roof construction that allows a vehicle occupant to view the environment through the roof while still permitting selective shading of the vehicle occupant from the sun through the roof even when relatively large roof viewing areas are required on relatively small roofs.

In carrying out the above object, a vehicle incorporating the invention includes a roof covering the occupant compartment and has a sunshade roof construction including a transparent roof panel through which the environment can be viewed from the occupant compartment. A sunshade is mounted below the transparent roof panel and includes a plurality of laterally elongated blades each of which has opposite ends. The sunshade also includes a flexible sheet-like shade that connects the blades. A pair of guides of the sunshade roof construction are supported below the transparent roof panel with each guide receiving one end of each blade to support the sunshade for movement between closed and open positions. In the closed position, the blades are spaced from each other below the transparent roof panel with the flexible shade extending between the blades to cooperate therewith in shading the occupant compartment from the transparent roof panel. In the open position, the blades are stored in a stacked relationship with the flexible shade folded therebetween at a location that exposes the occupant compartment to the transparent roof panel.

The sunshade roof construction as described above is capable of permitting relatively large viewing areas even on relatively small roofs due to the compact storage of the sunshade in the open position with the blades stacked as described and the flexible shade folded between the blades.

Different constructions of the blades of the sunshade are disclosed. One embodiment has each blade provided with a generally rigid sheet-like construction which may be made of metal such as sheet aluminum. Other embodiments have each blade provided with a wire construction including front and rear wire portions with the flexible sheet-like shade extending between the front and rear wire portions of each blade. According to one version, each of the wire blades includes wire end portions extending between and unitary with the front and rear wire portions. In another version, each blade includes end members having connections to the front and rear wire portions.

In the preferred embodiments disclosed, the sunshade roof construction also includes a power operated drive mechanism for moving the sunshade between the closed and open positions. This drive mechanism preferably includes at least one flexible drive member for moving the sunshade and also includes a power operated drive that moves the flexible drive member.

In the most preferred construction, the drive mechanism includes a pair of elongated flexible drive tapes one of which is supported by one of the guides and the other of which is supported by the other guide, and each drive tape has a connection to the sunshade. The drive mechanism of the sunshade roof construction has its power operated drive provided to selectively move both flexible drive tapes to provide the sunshade movement between the closed and open positions. Each drive tape has apertures spaced along its length and the drive mechanism includes a pair of toothed sprockets each of which is meshed with one of the apertured drive tapes. The power operated drive includes an electric drive motor that drives the sprockets to thus provide the driving that moves the drive tapes and hence the sunshade between the closed and open positions.

Different orientations of the drive tape are disclosed. In one orientation, each of the pair of drive tapes has a cross section that extends in a horizontal plane and the toothed sprockets rotate about generally horizontal axes which may be slightly inclined if necessary to accommodate for roof curvature. In another orientation, each of the pair of tapes has a cross section that extends in a vertical plane and the toothed sprockets rotate about generally vertical axes.

The connection of each drive tape to the sunshade is at the adjacent end of the forwardmost sunshade blade and the ends of the other rearward sunshade blades have drive projections that are received by the apertures in the drive tapes to provide the connections thereof to the drive tapes. Each guide includes a storage section that receives the ends of the sunshade blades in the stacked relationship with the sunshade in the open position. Each guide storage section includes a ramp where the drive projections of the rearward blade ends are received within and withdrawn from the drive tape apertures to make and uncouple the connections thereof to the drive tapes. The blade end drive projections are received by the drive tape apertures to maintain the rearward blades spaced from each other and from the forwardmost blade during movement to and from the closed position, and the blade end drive projections are withdrawn from the drive tape apertures at the ramps of the guide storage sections to permit storage of the blades in the stacked relationship with the sunshade in the open position.

Each drive tape in the preferred construction has small apertures that mesh with the associated sprocket to be driven thereby and also has large apertures that receive the drive projections of the blade ends.

In the preferred construction, each guide has a horizontally opening groove that receives one of the drive tapes and that also receives the adjacent ends of the sunshade blades to provide support and driving thereof between the closed and open positions. Each guide also includes a tape stowage section that receives the associated drive tape with the sunshade in the stored open position.

The sunshade construction disclosed also includes a flexible rotary drive member that connects the sprockets and is driven by the electric drive motor. This flexible rotary drive member is disclosed as including a pair of shafts each of which has an outer end connected to one of the sprockets and an inner end located adjacent the inner end of the other shaft. The flexible rotary drive member in one embodiment includes a universal joint that connects the inner ends of the shafts, and one of the shafts has an outer end driven by the electric motor.

In another embodiment, the rotary drive member includes a pair of shafts having inner ends driven by the electric motor and outer ends that drive the sprockets. In one version, the outer ends of the shafts are connected directly to the sprockets to provide driving of the sprockets about generally horizontal axes which may be slightly inclined if necessary to accommodate for roof curvature. In another version, the drive mechanism further includes a pair of worm gear sets that respectively connect the outer ends of the shafts and the sprockets to provide driving of the sprockets about generally vertical axes.

In a further version, the power operated drive member of the drive mechanism includes a drive screw for driving the blade ends at each side of the sunshade and each blade end has threaded projections driven by the associated drive screw.

In one preferred embodiment disclosed, the sunshade roof construction includes a vehicle roof having side rails that support the guides with the transparent roof panel extending between the roof side rails and with the sunshade located at the rear of the transparent panel in the stored open position.

In another preferred embodiment disclosed, the vehicle roof has side rails that support the transparent roof panel and a connection secures each guide to the lower surface of the transparent roof panel in a downwardly depending manner. This embodiment also includes a headlining section associated with each guide and a connection that secures each headlining section to the associated guide. Each of these connections is preferably detachable to facilitate installation and maintenance.

The sunshade roof construction is also disclosed as including a fan for drawing heated air from between the sunshade and the transparent roof panel. This fan preferably has an outlet that opens to the exterior of the vehicle. A solar panel is also preferably provided for driving the fan and is operable to do so when the fan is most needed to remove heated air from between the transparent roof panel and the sunshade.

The objects, features, and advantages of the present invention are readily apparent from the following detailed description of the best modes for carrying out the invention when taken in connection with the accompanying drawings.

BEST MODES FOR CARRYING OUT THE INVENTION

Figure 1:
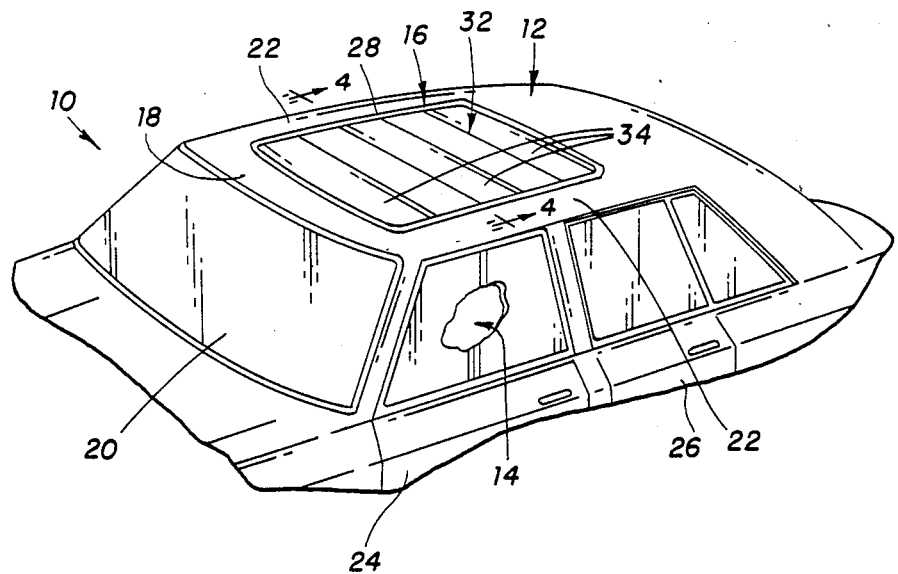
FIG. 1 is a partial perspective view of a vehicle including one version of a sunshade roof construction according to the invention with a sunshade thereof illustrated in a closed position with respect to a transparent roof panel.
Figure 2:
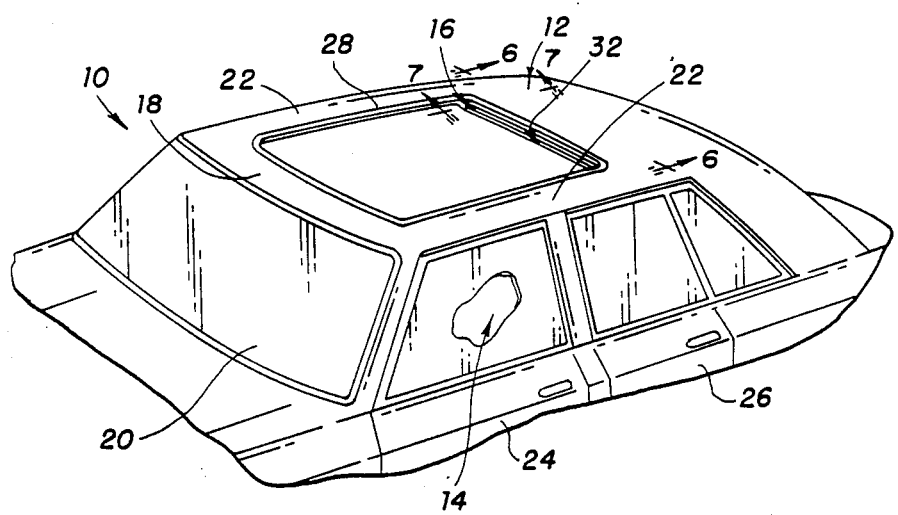
FIG. 2 is a partial perspective view similar to FIG. 1 but illustrating the sunshade in a stored open position with respect to the transparent roof panel.

With reference to FIGS. 1 and 2 of the drawings, a vehicle generally indicated by 10 includes a roof 12 that covers the occupant compartment 14 and includes a sunshade roof construction 16 in accordance with the present invention. This sunshade roof construction 16 is located just to the rear of the windshield header 18 which extends along the upper edge of the windshield 20 and is also located between the roof side rails 22 that extend along the upper edges of the front and rear doors 24 and 26 when the invention is incorporated with a four-door sedan type vehicle as illustrated. However, it should also be appreciated that the invention can likewise be incorporated with two-door type vehicles as well as four-door type vehicles as illustrated. One advantage of the invention, as is hereinafter more fully described, is that the sunshade roof construction allows a greater area of viewing while still being stowable below the roof 12.

Figure 4:
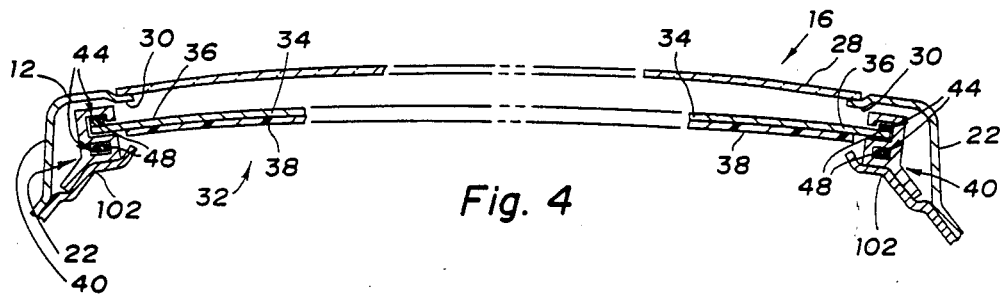
FIG. 4 is a sectional view taken along the direction of line 4—4 in FIG. 1 and illustrates the manner in which a pair of guides support the sunshade in the closed position.

As shown by continued reference to FIGS. 1 and 2, the sunshade roof construction 16 includes a transparent roof panel 28 through which the environment can be viewed from the occupant compartment 14. This transparent roof panel 28 is illustrated as having a generally rectangular shape and occupies a major portion of the roof 12 extending along the windshield header 18, the side rails 22, and between the side rails at the rear end of the roof. As shown in FIG. 4, each edge of the transparent roof panel 28 is supported by a depressed roof flange 30 in a suitably fixed relationship such that the roof 12 and transparent roof panel 28 have a generally continuous contour without any abrupt junction.

Figure 3:
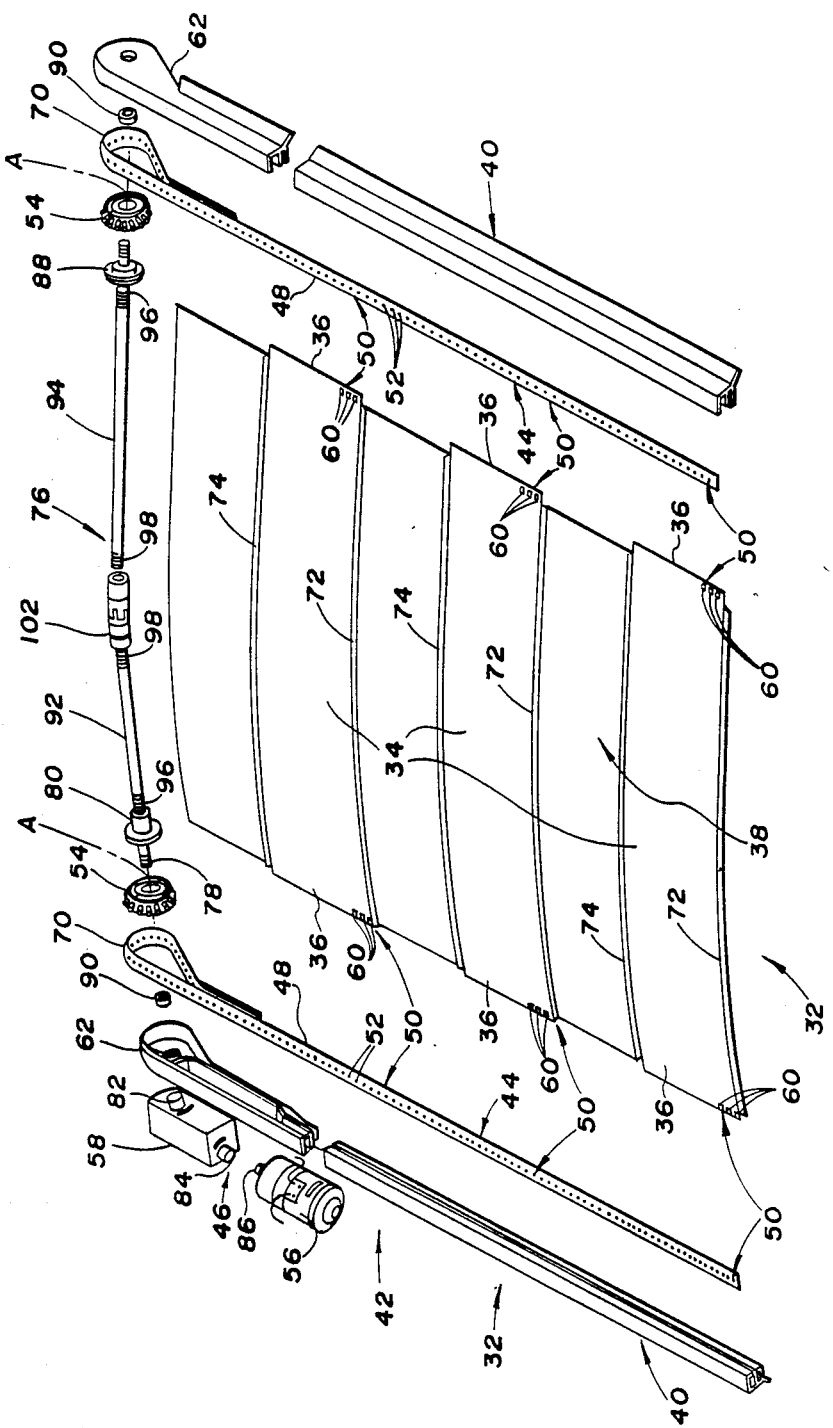
FIG. 3 is an exploded perspective view of the vehicle sunshade and one embodiment of an associated power operated drive mechanism that moves the sunshade between the closed and open positions.

With additional reference to FIGS. 3 and 4 as well as FIGS. 1 and 2, the sunshade roof construction 16 also includes a sunshade 32 mounted below the transparent roof panel 28 and includes a plurality of laterally elongated blades 34 each of which has opposite ends 36. Each of these blades 34 has a generally thin sheet-like construction which is most preferably made from sheet aluminum so as to have the requisite strength while still being relatively lightweight. Sunshade 32 also includes a flexible sheet-like shade 38 that connects the blades. A pair of guides 40 of the roof construction are illustrated in FIGS. 3 and 4 and are supported by the roof in a suitable manner extending along the roof side rails 22 with each guide receiving one end 36 of each blade 34 to support the sunshade for movement between the closed position of FIG. 1 and the open position of FIG. 2. In the closed position of FIG. 1, the blades 34 of the sunshade 32 are spaced from each other below the transparent roof panel 28 with the flexible shade 38 extending between the blades to cooperate therewith in shading the occupant compartment 14 from the transparent roof panel and in also providing an insulative air layer below the roof panel. In the open position of FIG. 2, the blades 34 are stored in a stacked relationship as shown in FIG. 7 with the flexible shade 38 folded therebetween at a location that exposes the occupant compartment to the transparent roof panel 28 so that the occupants can view the environment through the roof.

As illustrated in FIG. 3, the sunshade roof construction 16 also preferably includes a power operated drive mechanism 42 for moving the sunshade between the closed and open positions of FIGS. 1 and 2. This power operated drive mechanism 42 preferably includes at least one flexible drive member 44 and also includes a power operated drive 46 that moves the flexible drive member. As illustrated, the preferred construction of the drive mechanism includes a pair of the elongated drive members embodied by flexible drive tapes 48 which are supported by the guides 40. Each drive tape has a connection 50 to the sunshade 32 at the forwardmost blade 34 such that operation of the drive mechanism 42 through reverse driving of its drive 46 selectively moves the flexible drive tapes 48 to provide the sunshade movement between the closed and open positions of FIGS. 1 and 2.

Figure 5:
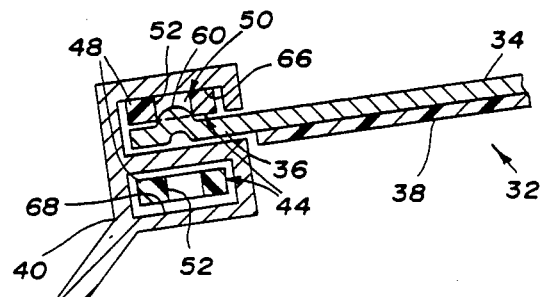
FIG. 5 is a partial sectional view taken in the same direction as FIG. 4 but on an enlarged scale to better illustrate the construction of each guide.

As illustrated in FIGS. 3 and 5, each drive tape 48 has apertures 52 spaced along its length and the power drive 46 includes a pair of toothed sprockets 54 each of which is meshed with one of the apertured drive tapes. An electric drive motor 56 of the power operated drive 46 drives a gear box 58 that drives the sprockets 54 to move the drive tapes 48 and hence the sunshade between the closed and open positions. The ends 36 of the sunshade blades 34 have drive projections 60 that are received by the apertures 52 in the drive tapes 48 to provide the connections of the drive tapes to the sunshade. The forwardmost connection 50 of each drive tape is permanent while the rearward ones are coupled and uncoupled during the sunshade movement as is hereinafter described.

Figure 6:
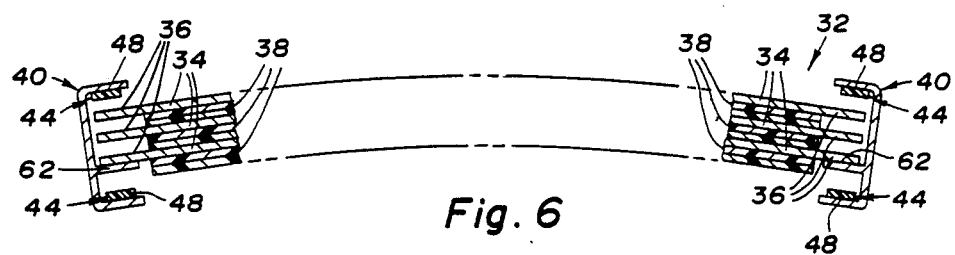
FIG. 6 is a partial sectional view taken along the direction of line 6—6 in FIG. 2 and illustrates the sunshade roof construction in its stored open position.
Figure 7:
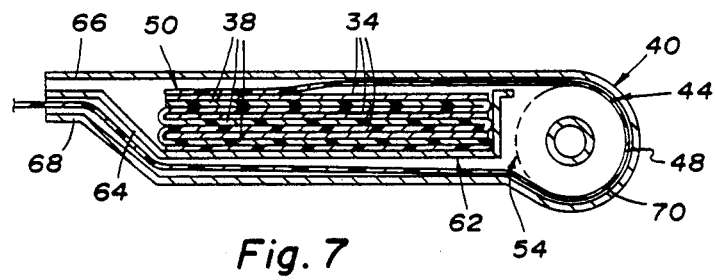
FIG. 7 is a partial sectional view taken along the direction of line 7—7 in FIG. 2 to further illustrate the manner in which the sunshade is stored in the open position.

As shown best in FIGS. 6 and 7, each guide 40 includes a storage section 62 that receives the ends of the sunshade blades in a stacked relationship with the sunshade in the open position. In this stored position, the flexible shade 38 is folded between the stacked blades 34 with a flattened S-shape between each adjacent pair of blades. Each guide storage section 62 includes a ramp 64 where the projections 60 of the ends 36 of all but the forwardmost blade 34 are received by and withdrawn from the drive tape apertures 52 to make and uncouple the rearward connections of the drive tapes to the sunshade 32. The blade end drive projections 60 are received by the drive tape apertures 52 at the ramps 64 to maintain the rearward blades spaced from each other during movement to and from the closed position in order to thereby prevent the shade 38 from sagging downwardly as the sunshade is moved from the closed position to the open position. The rearward blade end projections 60 are withdrawn from the drive tape apertures 52 at the ramps 64 of the guide storage sections to permit the storage of the blades 34 in the stacked relationship shown in FIG. 7 with the sunshade in the open position of FIG. 2. As previously mentioned, the ends 36 of the forwardmost blade 34 are permanently connected to the drive tapes 48 by any suitable type of connections 50, as shown in FIG. 7, such as by affixing the projections within the apertures 52 or by the use of rivets or other suitable fasteners.

As illustrated best in FIGS. 5 and 7, each guide 40 has a horizontally opening groove 66 that receives one of the drive tapes 48 and the adjacent ends 36 of the sunshade blades 34 to provide support and driving thereof between the closed and open positions. Each guide 40 also includes a tape stowage section 68 that receives the associated drive tape 48 with the sunshade in the stored open position. The drive tapes 48 each move through a return loop 70 (FIG. 3) within the storage section 62 while moving between the groove 66 and stowage section 68 shown in FIGS. 4 and 5.

As shown in FIG. 4, each sunshade blade 34 has an upwardly convex curved shape which provides strengthening that enables the blades to bridge a wider gap between the guides 40 than would otherwise be possible as well as providing greater headroom. In this regard, each blade as shown in FIG. 3 also has front and rear flanges 72 and 74 that provide further strengthening. The pair of toothed sprockets 54 illustrated in FIG. 3 are mounted on inclined axes A to accommodate for the curvature of the sunshade roof construction as a result of the upwardly convex blades 34.

With continuing reference to FIG. 3, the power operated drive 46 has a flexible rotary drive member 76 that connects the inclined sprockets 54 and has an end 78 provided by a coupling 80 that is connected to an output 82 of the gear box 58 whose input 84 is driven by the output 86 of the electric drive motor 56. Another similar coupling 88 embodies the other end of the flexible drive member 76. Both couplings 78 and 88 are supported by associated bearings 90 on the storage sections 62 of the guides 40 for rotation about their inclined axes A. Flexible rotary drive member 76 is preferably embodied by a pair of shafts 92 and 94 each of which has an outer end 96 connected by its associated coupling 78 or 88 to the adjacent sprocket 54 and each of which also has an inner end 98 located adjacent the inner end of the other shaft. A universal joint 102 connects the inner shaft ends 98 to permit driving therebetween despite the skewed relationship between the axes of the shafts as a result of the inclination of the tooth sprockets 54 as previously discussed. It should also be appreciated that the drive motor can be located a central location driving the inner ends 98 of the shafts, with the shafts being flexible to accommodate for the inclination of the sprockets 54.

As shown in FIG. 4, the vehicle roof 12 has the guides 40 supported by its side rails 22 in any suitable such as on the inner rail members 102 thereof. The transparent roof panel 28 is located between the side rails 22 as previously mentioned within the depressions defined by the flanges 30 of the roof 12. In the stored open position illustrated in FIG. 2, the sunshade 32 is located at the rear of the transparent roof panel 28 extending laterally between the side rails 22. This construction permits a relatively large amount of roof area to be opened by the transparent roof panel 28 while still providing storage below the exterior of the roof with minimal intrusion on the occupant compartment headroom.

Best results are achieved when the shade 32 has reflective properties for reflecting the sun's radiation in the closed position so as to thereby prevent undesirable heating of the vehicle occupant compartment. This is advantageously achieved by providing the shade 38 with an upper surface of plastic on which there is a reflective film in combination with the aluminum slats 34 which may be polished and/or provided with a reflective film to increase the reflection that prevents radiant heating.

It should also be appreciated that the transparent roof panel 28 may likewise have an outer reflective surface or tinting to eliminate objectionable direct sunlight while still permitting viewing through the roof.

Figure 8:
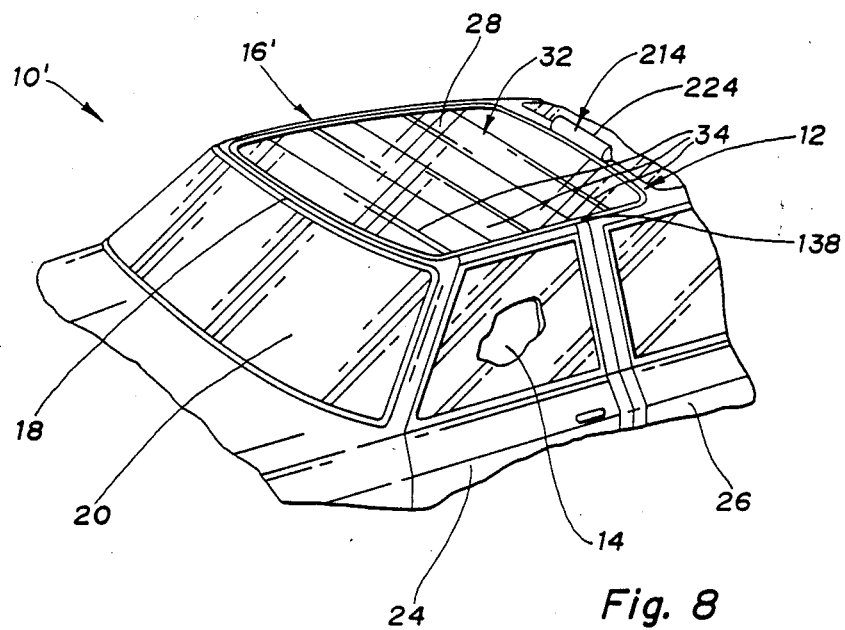
FIG. 8 is a partial perspective view of a vehicle including another version of a sunshade roof construction according to the invention with the sunshade thereof illustrated in a closed position with respect to the transparent roof panel.
Figure 9:
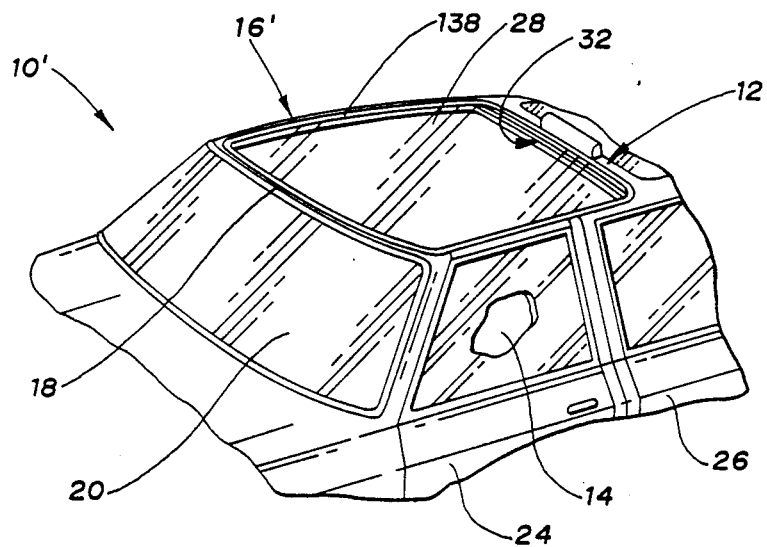
FIG. 9 is a partial perspective view similar to FIG. 8 but illustrating the sunshade in a stored open position with respect to the transparent roof panel.

With reference to FIGS. 8 and 9, another embodiment of a vehicle 10' includes a sunshade roof construction 16' which is similar to the previously described embodiment such that like reference numerals are applied thereto and the construction thereof is the same such that the previous description is applicable except as will be noted. In this vehicle 10', the roof 12 covers the occupant compartment 14 as with the other embodiment such that the sunshade roof construction 16' allows the vehicle occupant upward observation with the sunshade in the open position of FIG. 9 while shading the occupant in the closed position of FIG. 8.

Figure 13:
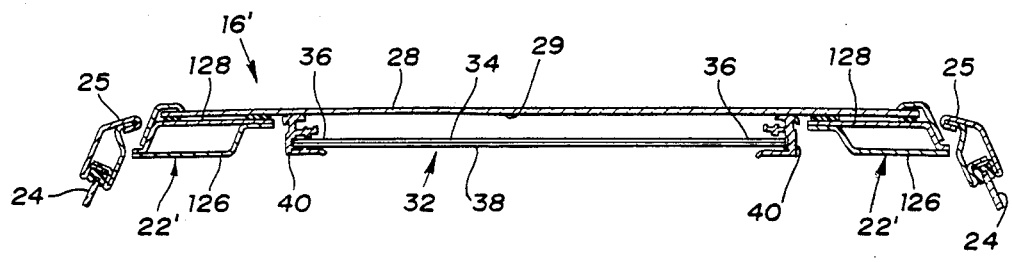
FIG. 13 is a cross-sectional view on a somewhat smaller scale than FIG. 12 illustrating the manner in which the sunshade roof construction is mounted on the roof by a drop-in procedure that facilitates assembly.

As illustrated in FIGS. 8, 9, and 13, the transparent roof panel 28 of this embodiment extends the entire distance between window frames 25 of the side doors 24 and is supported by the vehicle side rails 22'. The sunshade 32 as shown in FIG. 13 is supported by the lower surface 29 of the transparent roof panel 28 so as to thereby permit assembly of the sunshade roof construction in a drop-in manner which is subsequently described.

Figure 10:
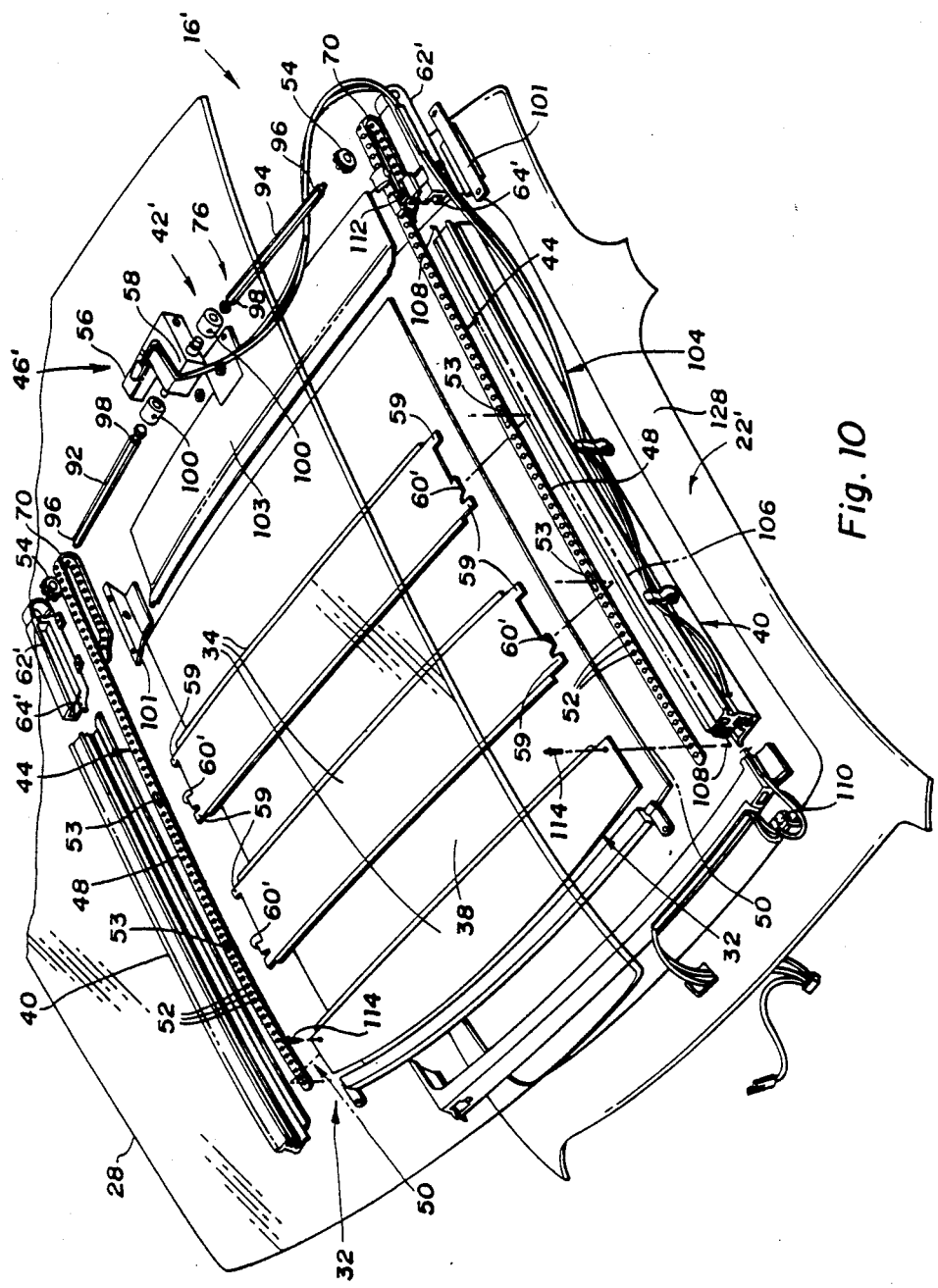
FIG. 10 is an exploded perspective view of the vehicle sunshade and an embodiment of an associated power operated drive mechanism that moves the sunshade between the closed and open positions.

As illustrated in FIG. 10, the power operated drive mechanism 42' is generally similar to the drive mechanism illustrated in FIG. 3 except for location of the electric motor 56 and its gear box 58 at a central location driving a pair of universal joints 100 to provide the rotational driving of the inner ends 98 of the pair of shafts 92 and 94. The outer ends 96 of the shafts 92 and 94 drive the sprockets 54 about generally horizontal axes that may be somewhat inclined to accommodate for roof curvature as described previously in connection with the embodiment of FIG. 3. Also, the storage section 62' and ramp 64' of each guide 40 is secured to an associated bracket 101 and a storage member 103 extends between these brackets to provide support for the sunshade 32 centrally between the guides. A wire bundle 104 energizes the drive motor 56. A schematically indicated switch actuating member 106 of an elongated construction hereinafter described has ends 108 that respectively operate front and rear limit switches 110 and 112 to control the drive motor operation in the extremes of travel of the sunshade 32.

With continuing reference to FIG. 10, the forwardmost blade 34 is illustrated as having its connection 50 to the pair of drive tapes 48 embodied by fasteners 114 such as rivets or any other suitable type of securement. Each of the rearward blades 34 has its ends 36 provided with support tabs 59 as well as having drive projections 60 that are somewhat inclined (FIG. 14) and received within larger apertures 53 in the associated drive tapes 48. The small apertures 52 mesh with the drive sprockets 54 while the drive projections 60 are received within and withdrawn from the large apertures 53 during movement out of and back into the guide storage sections 62 shown in FIG. 10. This construction prevents the rearward blades 34 from being prematurely pulled out of the storage sections such as by manual upward pushing of the shade 38 that extends between the blades. In such instances, the larger projections 60 merely slide over the smaller apertures 52 until the tape is sufficiently driven outward to provide alignment thereof with the large apertures 53.

Figure 11:
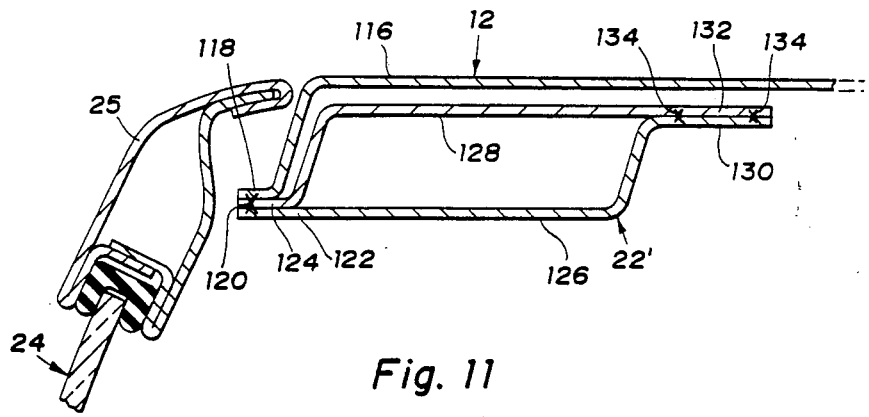
FIG. 11 is a cross-sectional view taken through a vehicle side door frame and the adjacent edge of the vehicle roof to illustrate the vehicle roof structure on which the sunshade roof construction is assembled.

As illustrated in FIG. 11, a conventional vehicle on which the sunshade 32 is installed includes a roof 12 having an outer roof panel 116 whose outboard flange 118 is secured by a weld 120 to outboard flanges 122 and 124 of inner and outer members 126 and 128 of the roof side rail 22'. Inboard flanges 130 and 132 of the side rail inner and outer members 126 and 128 are secured to each other by welds 134 and are located in a spaced relationship to the roof panel 116.

Figure 12:
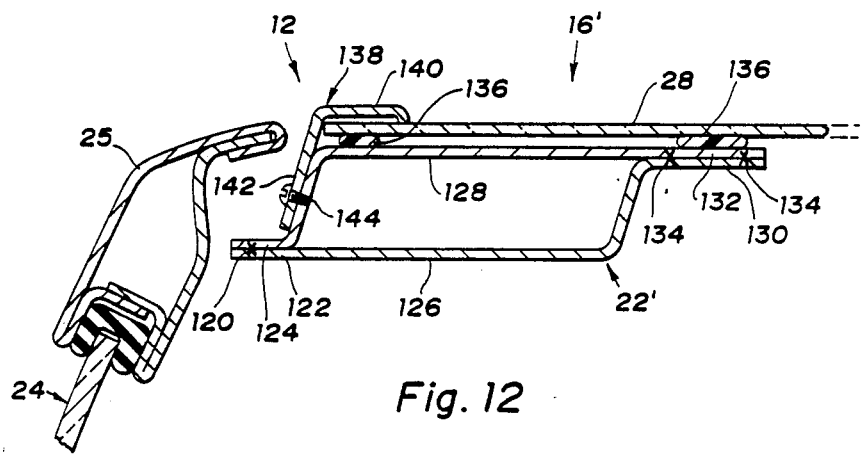
FIG. 12 is a cross-sectional view taken at the same location as FIG. 11 but after installation of the sunshade roof construction of the embodiment shown in FIGS. 8 and 9.

As illustrated in FIG. 12, the sunshade roof construction 16' is installed by first removing the roof panel 116 by breaking the weld 120 to its flange 118 so as to thereby expose the side rail 22. The transparent panel 28 of the sunshade roof construction 16' is then dropped onto the vehicle side rails 22 with beads of sealant 136 providing support thereof in a sealed relationship. A trim piece 138 has an upper trim portion 140 that covers the edge of the transparent roof panel 28 and has a lower leg 142 secured by a suitable fastener 144 to the side rail outer member 128 just inboard from its outboard flange 124. It should be noted that the outboard edge portion of the transparent panel 28 preferably is provided with dark ceramic paint to hide the beads of sealant 136 from view in order to thereby provide an aesthetically appealing appearance.

Figure 14:
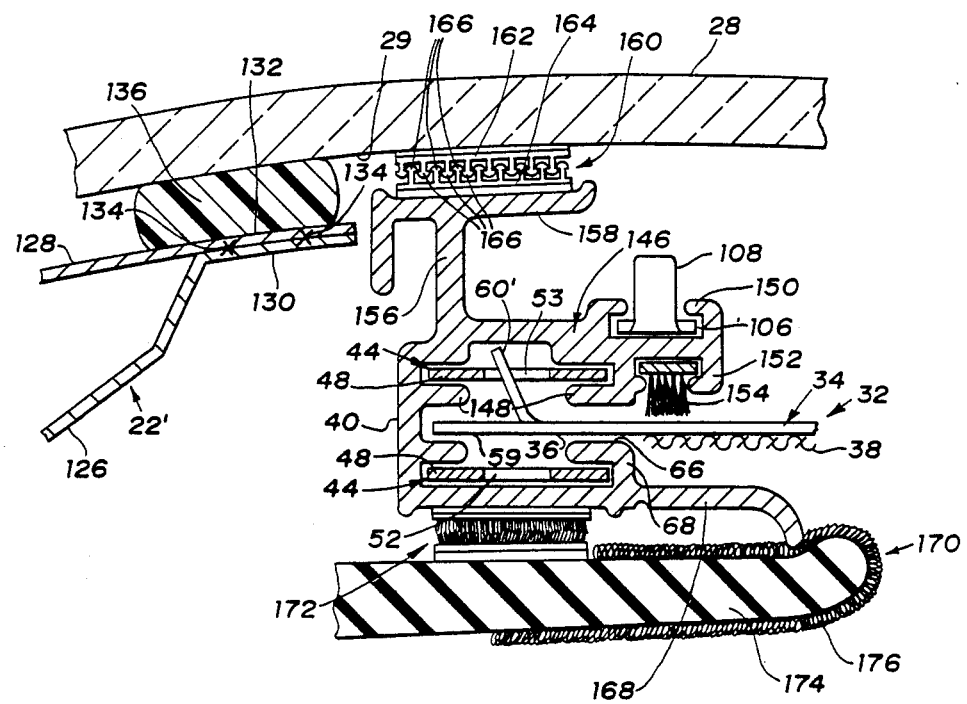
FIG. 14 is an enlarged view of a portion of FIG. 13 to illustrate the construction of the guide that supports the sunshade for movement between the closed position of FIG. 8 and the open position of FIG. 9.

As illustrated in FIG. 13, mounting of the transparent panel 28 as illustrated on the roof side rails 22' permits a drop-in type assembly that facilitates fabrication of the vehicle sunshade roof construction. As shown in FIG. 14, each of the guides 40 of the sunshade is supported by the lower surface 29 of the transparent roof panel 28 and has its horizontally opening groove 66 receiving the support tabs 59 of the blade ends 36. Within each guide 40, the blade end drive projections 60' extend upward from the rearward blades to be received within the large tape apertures 53 previously described in order to provide the driving of the blades 34 between the open and closed positions. An upper guide portion 146 located above the groove 66 has elongated ribs 148 between which the drive projections 60' extend upwardly into the associated tape aperture 53 with the tape 48 being supported thereby during forward and rearward driving movement. At its inboard end, the upper guide portion 146 includes a slideway 150 that supports the switch actuating member 106 whose opposite ends 108 project upwardly to operate the limit switches that control extremes of driving movement. Below the slideway 150, the upper guide portion 156 includes a seal mounting portion 152 for supporting a brush type seal 154 that engages the upper surface of the sunshade 32 at its blades 34 and at its sheet-like shade 38 that extends between the blades 34 and is suitably secured to their lower surfaces.

With continuing reference to FIG. 14, each guide 44 also includes an upwardly extending support arm 156 having an upper flange 158 secured by a connection 160 to the lower surface 29 of the transparent roof panel 28. This connection 160 is preferably of the detachable type and is illustrated as including two fastener strips 162 and 164 respectively bonded to the lower surface 29 of the transparent roof panel 28 and the upper surface of the guide flange 158. These fastener strips 162 and 164 have identical locking heads 166 that interlock with each other by a snap action that permits detachment for maintenance and repair if necessary.

As also shown in FIG. 14, each guide 40 has a lower leg 168 to which a headlining section 170 is secured by a connection 172. This connection 172 is also preferably of the detachable type including hook and loop fasteners to thereby facilitate the securement of the headlining section upon assembly as well as permitting its removal for maintenance and repair. Headlining section 170 is illustrated as having a core 174 with a suitable covering 176 that may be of cloth or another suitable material with an aesthetically appealing appearance.

Figure 15:
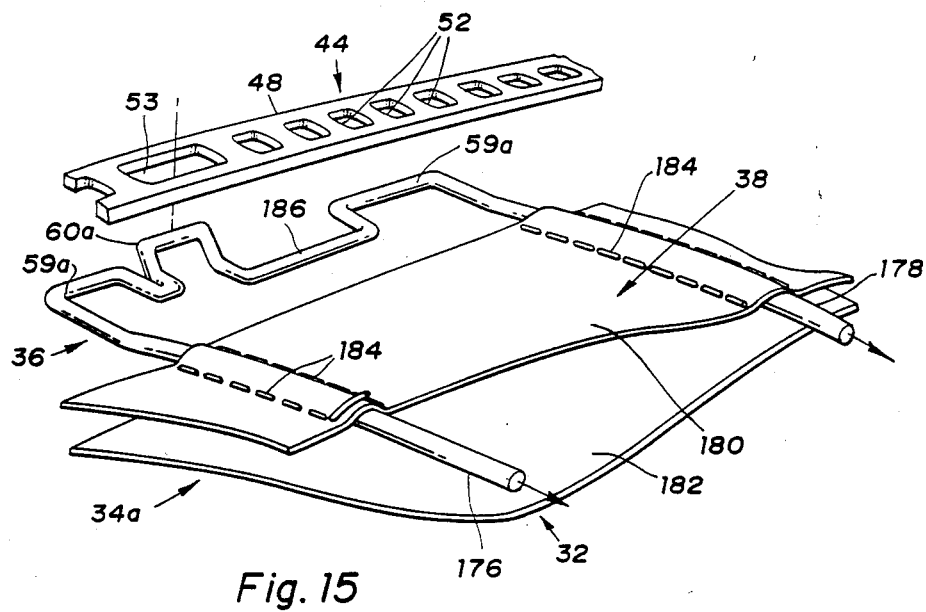
FIG. 15 is a partial perspective view illustrating another construction of the sunshade blade.

With reference to FIG. 15, a modification of the sunroof blade construction is identified by 34a and has a wire construction including front and rear wire portions 176 and 178. The flexible sheet-like shade 38 is illustrated as having two layers 180 and 182 that respectively extend above and below the wire portions with stitching 184 providing securement therebetween such that the blade is operable in the manner previously described. This construction of the blade is also illustrated as having wire end portions 186 that extend between and are unitary with the front and rear wire portions 176 and 178 at each blade end 36. The wire end portions 186 each are bent to provide a pair of front and rear support tabs 59a for slidably supporting the blade within the associated guide and are also bent to form the inclined drive projection 60a previously described for being received within the large aperture 53 of the drive tape 48 which has the elongated shape of its cross section extending horizontally as illustrated.

Figure 16:
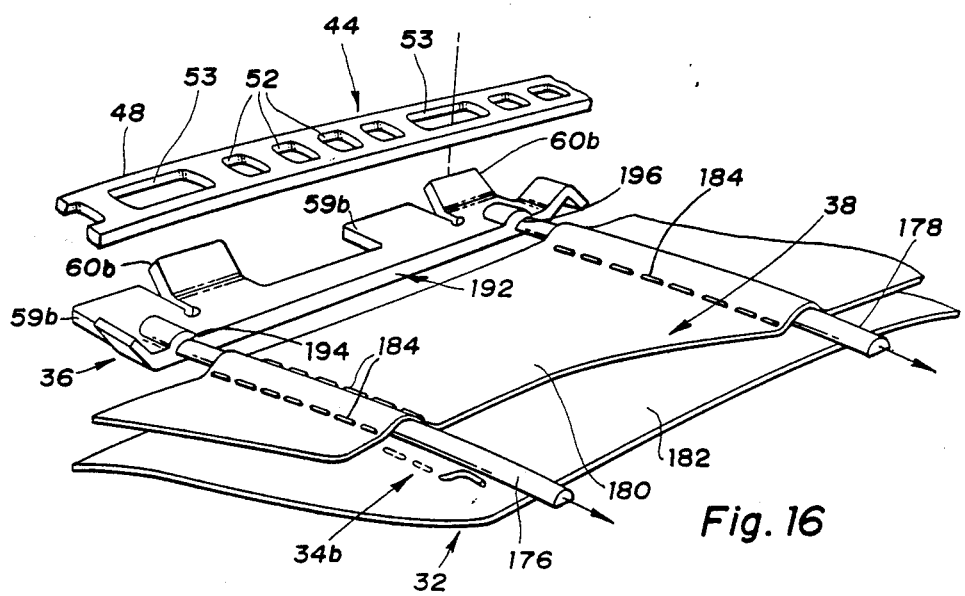
FIG. 16 is a partial perspective view illustrating a still further version of the sunshade blade.

With reference to FIG. 16, another embodiment of the sunshade blade is identified by 34b and has the same wire construction illustrated in FIG. 15 with the front and rear wire portions 176 and 178 connected by the layers 180 and 182 of the flexible sheet-like shade 38 with the stitching 184 providing securement. However, in this embodiment, the blade end 36 includes end members 192 at the opposite ends thereof for connecting the front and rear wire portions 176 and 178. Each end member 192 has front and rear connections 194 and 196 to the adjacent ends of the front and rear wire portions 176 and 178 and is easily manufactured as a plastic injection molding with the construction illustrated. More specifically, each end member 192 includes front and rear support tabs 59b for providing slidable support of the blade end on the associated guide and is also illustrated as including a pair of the inclined drive projections 60b that are respectively received within the large apertures 53 in the drive tape 48 in order to thereby provide driving of the adjacent blade end during the drive tape movement previously described.

Figure 17:
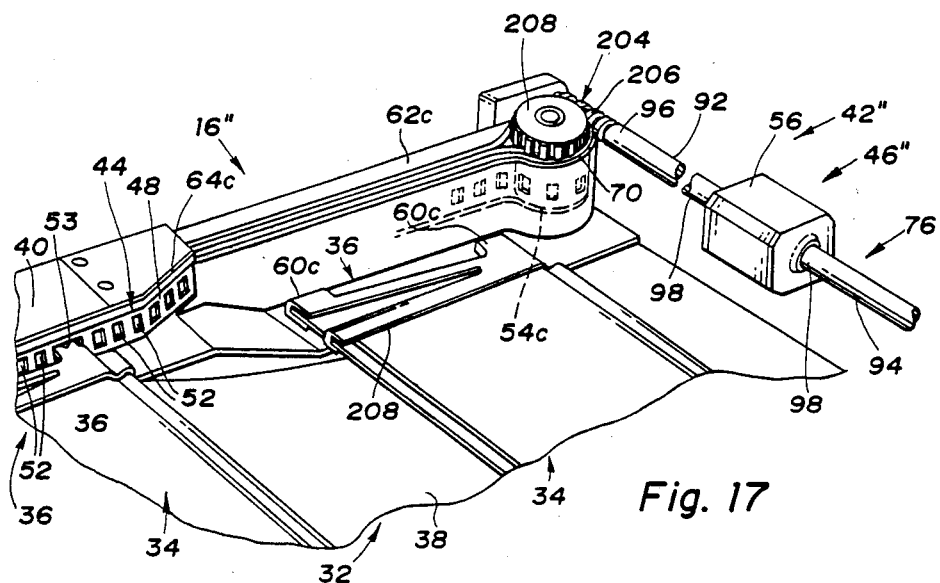
FIG. 17 is a partial perspective view that illustrates another construction of the drive mechanism wherein the drive tapes have vertical orientations and are driven by sprockets that rotate about generally vertical axes as opposed to the generally horizontal axes illustrated in the embodiments of FIGS. 3 and 10 which have horizontally oriented drive tapes.

With reference to FIG. 17, another embodiment of the sunshade roof construction 16" is illustrated as a drive mechanism 42" having drive tapes 48 with cross sections whose elongated shapes each extend vertically rather than horizontally as with the previously described embodiments. In this construction, the guide storage section 62c has a ramp 64c that converges laterally with the ramp of the other storage section in a forward direction such that the projection 60c of the rearward blades 34 are received within and withdrawn from the large apertures 53 in the drive tape 48 during forward and rearward movement, respectively, of the sunshade 32. Such movement is provided by the associated drive sprocket 54c which rotates about a generally vertical axis and is driven by a worm gear set 204. This worm gear set 204 includes a worm 206 connected to the outer end of the associated shaft 92 and a gear 208 driven by the worm and connected to the sprocket 54c to provide its driving. An electric motor 56 connected to the inner ends of the pair of shafts 92 and 94 provides rotary driving of the shafts to drive the worm gear sets at the outer ends of the shafts. Each of the rearward blades 34 is illustrated as having an end member 208 that is secured to the blade end 36 and supports the pair of driving projections 60c for registration with the large apertures 53 of the drive tape upon forward movement along the storage section ramp 64. Upon rearward movement, the projections 60 are withdrawn from the large apertures 53 of the drive tape in order to permit the stacking of the blades as previously described with the shade 38 extending between the blades in its folded relationship.

Figure 18:
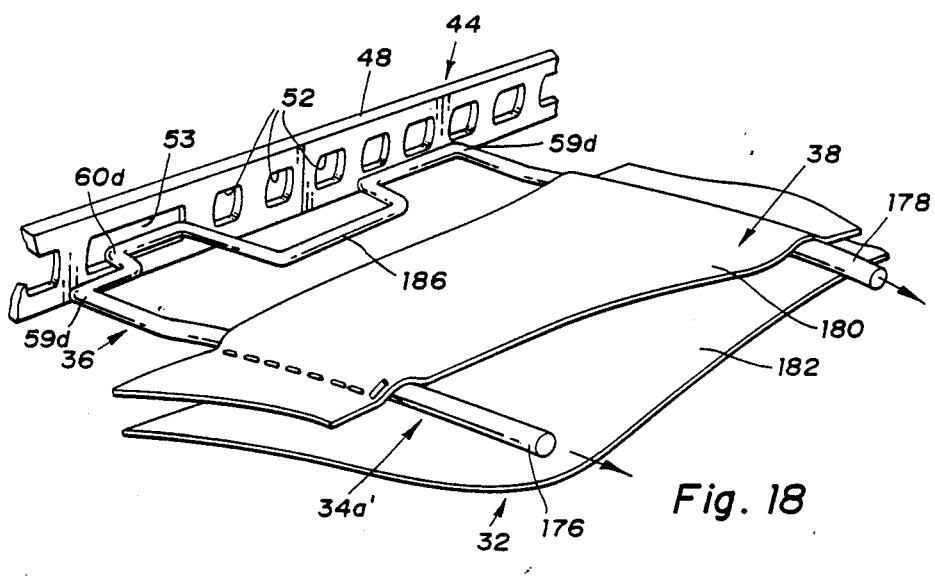
FIGS. 18 and 19 are views that respectively illustrate the alternate blade constructions illustrated in FIGS. 15 and 16 but adapted for use with the drive mechanism illustrated in FIG. 17.
Figure 19:
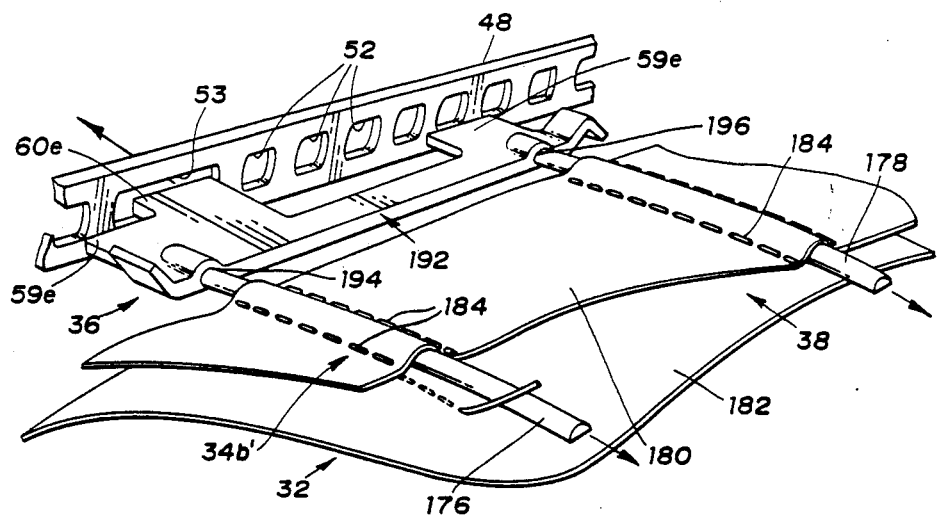

As illustrated in FIG. 18, another embodiment of the sunshade blade 34a' has the same construction as the embodiment of FIG. 15 with front and rear wire portions 176 and 178 connected by a wire portion 186 unitary therewith. This wire blade also has the shade 38 connecting the front and rear wire portions by layers 180 and 182 secured by stitching 184 and also has support tabs 59d like the previously described embodiment. However, the drive projection 60d of this embodiment extends horizontally so as to register with the large aperture 53 of the vertically oriented drive tape 48 as in the construction illustrated in FIG. 17.

Another embodiment of the sunshade blade 34b' has the same construction as the embodiment of FIG. 16 with the front and rear wire portions 176 and 178 connected by the end member 192 with the flexible shade 38 having its layers 180 and 182 extending therebetween and secured by stitching 184. Likewise this blade embodiment has its own member 192 provided with support tabs 59e as with the embodiment of FIG. 16. However, the drive projection 60e of this embodiment extends horizontally so as to be received within the large aperture 53 in the vertically oriented drive tape.

Figure 20:
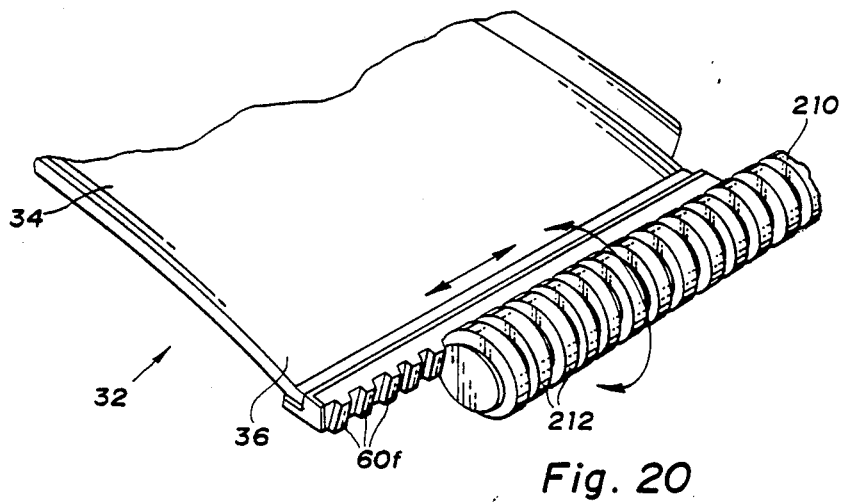
FIG. 20 is a partial perspective view that illustrates another version of the drive mechanism.

With reference to FIG. 20, the power operated drive mechanism is disclosed as including a drive screw 210 that rotates about a longitudinal axis and has a helical thread 212 mated with helical portions providing the drive projections 60f so as to thereby move each blade 34 forwardly and rearwardly. This construction of the power operated drive mechanism and the blades 34 of the sunroof construction is provided such that all but the forwardmost blade disengage from the drive screw 210 upon movement to the rearward storage position as previously described.

Figure 21:
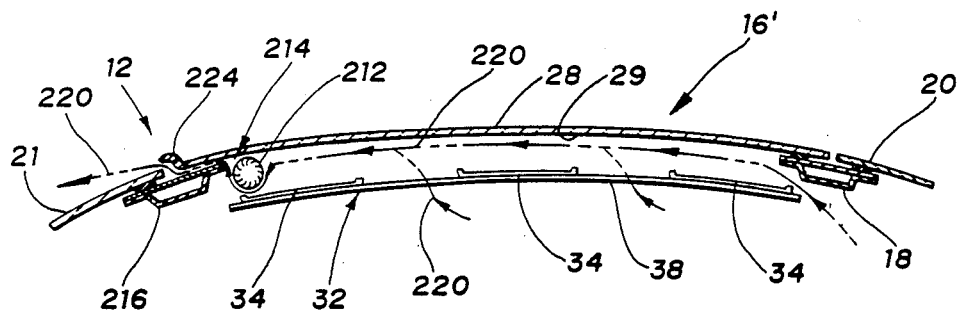
FIG. 21 is a longitudinal sectional view taken through the center of the vehicle roof looking sideways and illustrating the construction of a fan that removes heated air from between the transparent roof panel and the sunshade in the closed position.
Figure 22:
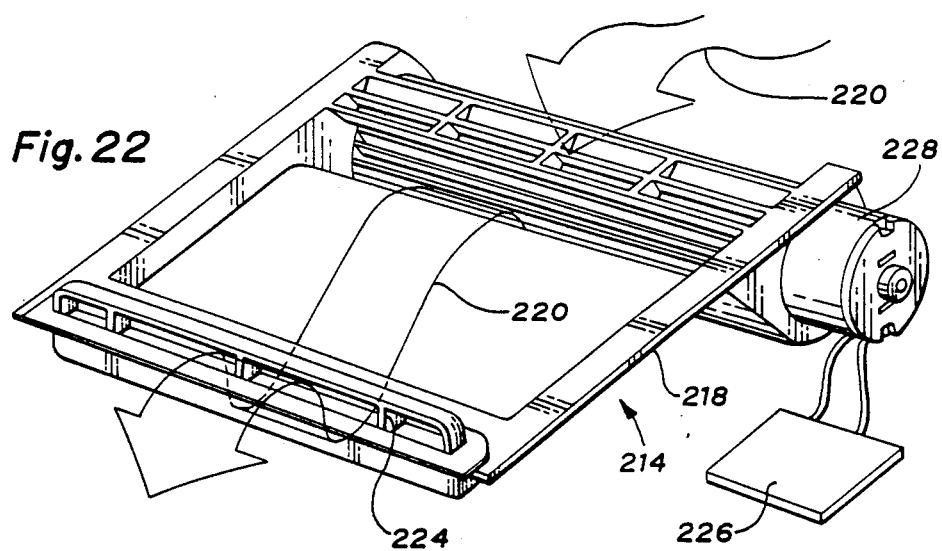
FIG. 22 is a perspective view illustrating the construction of the fan and also illustrating a solar panel that provides driving of the fan.
Figure 23:
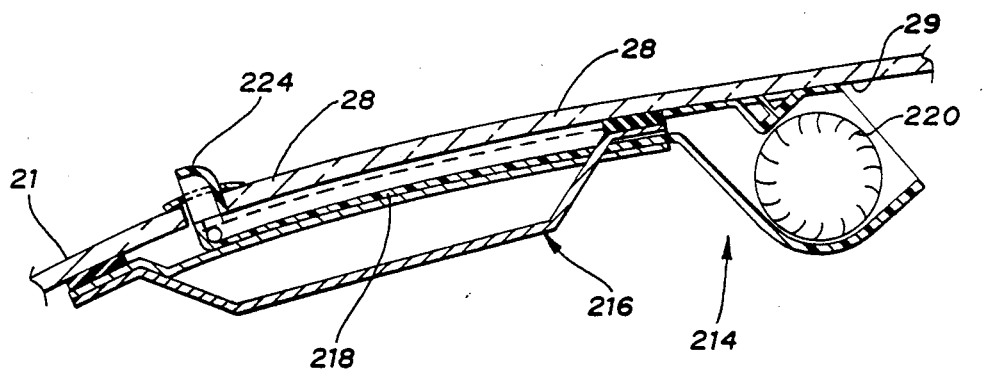
FIG. 23 is an enlarged view illustrating the construction of the fan in its mounted relationship with respect to the transparent roof panel and the rear window header of the vehicle.

As illustrated in FIGS. 21 through 23, the sunshade roof construction may also include a fan 214 for drawing heated air from between the sunshade 32 and the transparent panel 28. This fan is shown as being located adjacent the vehicle back window 21 supported on the back window header 216. Fan 214 is illustrated as having a housing 218 that supports a squirrel cage rotor 220 functioning as an inlet into the housing 218 for air flow along the paths 220 shown in FIGS. 21 and 22. Housing 218 of the fan also has an outlet 224 that projects upwardly from between the back window 21 and the transparent roof panel 28 in a rearwardly facing direction so as to thereby permit the exhaust of the heated air to the environment. This heated air is replaced by air drawn between the windshield header 18 and the front edge of the sunshade 32 and by air that flows through the shade 38 when porous cloth fabric is used. A solar panel 226 illustrated in FIG. 22 is also provided for energizing the electric fan motor 228 that drives the squirrel cage rotor 220.

While the best modes for carrying out the invention have been described in detail, those familiar with the art to which this invention relates will recognize various alternative designs and embodiments for carrying out the invention as defined by the following claims.

What is claimed is:

1. For use with a vehicle including a roof covering an occupant compartment, a sunshade roof construction comprising: a transparent roof panel through which the environment can be viewed from the occupant compartment; a sunshade mounted below the transparent roof panel and including a plurality of laterally elongated blades each of which has opposite ends; said sunshade also including a flexible sheet-like shade that connects the blades; a pair of guides supported below the transparent panel with each guide receiving one end of each blade to support the sunshine for movement between: a closed position where the blades are spaced from each other below the transparent roof panel with the flexible shade extending between the blades to cooperate therewith in shading the occupant compartment from the transparent roof panel, and an open position where the blades are stored in a stacked relationship with all of the blades located in a single vertical stack at a location that exposes the occupant compartment to the transparent roof panel and with portions of the flexible shade folded between the stacked blades; and a mechanism including means for connecting to the blade ends to maintain the blades spaced from each other during movement to and from and while in the closed position, and the means of the mechanism disconnecting from certain blade ends upon movement to the open position to permit the storage of the blades in the stacked relationship with the portions of the flexible shade folded between the blades.

2. A sunshade roof construction as in claim 1 wherein each blade has a generally rigid sheet-like construction.

3. A sunshade roof construction as in claim 1 wherein each blade has a wire construction including front and rear wire portions, and the flexible sheet-like shade extending between the front and rear wire portions of each blade.

4. A sunshade roof construction as in claim 3 wherein each blade includes wire end portions extending between and unitary with the front and rear wire portions.

5. A sunshade as in claim 3 wherein each blade includes end members having connections to the front and rear wire portions.

6. A sunshade roof construction as in claim 1 wherein said mechanism comprises a power operated drive mechanism for moving the sunshade between the closed and open positions.

7. A sunshade roof construction as in claim 6 wherein the drive mechanism includes at least one flexible drive member for moving the sunshade and also includes a power operated drive that moves the flexible drive member.

8. A sunshade roof construction as in claim 1 wherein the mechanism includes a pair of elongated flexible drive tapes one of which is supported by one guide and the other of which is supported by the other guide, and each drive tape having a permanent connection to the sunshade.

9. A sunshade roof construction as in claim 8 wherein each drive tape has apertures spaced along its length, the mechanism including a pair of toothed sprockets each of which is meshed with one of the apertured drive tapes, and at least one rotary drive member that connects the sprockets for rotation with each other.

10. A sunshade roof construction as in claim 9 wherein each tape has a cross section that extends with an elongated shape in a horizontal plane, and the toothed sprockets rotating about generally horizontal axes.

11. A sunshade roof construction as in claim 9 wherein each tape has a cross section that extends with an elongated shape in a vertical plane, and the toothed sprockets rotating about generally vertical axes.

12. A sunshade roof construction as in claim 9 wherein the permanent connection of each drive tape to the sunshade is at the adjacent end of the forwardmost sunshade blade, and the ends of the other rearward sunshade blades having drive projections that are received by the apertures in the drive tapes to provide the connection and disconnection thereof to and from the drive tapes.

13. A sunshade roof construction as in claim 12 wherein each guide includes a storage section that receives the ends of the sunshade blades in the stacked relationship with the sunshade in the open position, each guide storage section including a ramp where the drive projections of the rearward blade ends are received by and withdrawn from the drive tape apertures to to connect and disconnect the drive tapes to and from the sunshade, the blade end drive projections being received by the drive tape apertures at the ramps to maintain the blades spaced from each other during movement to and from the closed position, and the blade end drive projections being withdrawn from the drive tape apertures at the ramps of the guide storage sections to permit storage of the blades in the stacked relationship with the sunshade in the open position.

14. A sunshade roof construction as in claim 13 wherein each drive tape has its apertures including: (a) small apertures that mesh with the associated sprocket to be driven thereby and (b) large apertures that receive the drive projections of the blade ends.

15. A sunshade roof construction as in claim 13 wherein each guide has a horizontally opening groove that receives one of the drive tapes and adjacent ends of the sunshade blades to provide support and driving thereof between the closed and open positions.

16. A sunshade roof construction as in claim 15 wherein each guide also includes a tape stowage section that receives the associated drive tape with the sunshade in the open position.

17. A sunshade roof construction as in claim 9 wherein the mechanism comprises a power operated drive mechanism for moving the sunshade between the closed and open positions, and said power operated drive mechanism including a rotary drive that includes an electric motor for driving the rotary drive member connected to the sprockets.

18. A sunshade roof construction as in claim 17 wherein the rotary drive member includes a pair of shafts each of which has an outer end connected to one of the sprockets and an inner end located adjacent the inner end of the other shaft, the rotary drive member also including a universal joint that connects the inner ends of the shafts, and one of the shafts having an outer end driven by the electric motor.

19. A sunshade roof construction as in claim 17 wherein the rotary drive member includes a pair of shafts having inner ends driven by the electric motor and outer ends that drive the sprockets.

20. A sunshade roof construction as in claim 19 wherein the outer ends of the shafts are connected directly to the sprockets to provide driving of each sprocket about generally horizontal axes.

21. A sunshade roof construction as in claim 19 further including a pair of worm gear sets that respectively connect the outer ends of the shafts with the pair of sprockets to provide driving of the pair of sprockets about generally vertical axes.

22. A sunshade roof construction as in claim 1 wherein the mechanism comprises a power operated drive mechanism including a drive screw for driving the blade ends at each side of the sunshade, and each blade end having thread projections driven by the associated drive screw.

23. A sunshade roof construction as in claim 1 wherein the vehicle roof has side rails that support the guides, the transparent roof panel extending between the roof side rails, and the sunshade being located at the rear of the transparent panel in the stored open position.

24. A sunshade as in claim 1 wherein the vehicle roof has side rails that support the transparent panel, and a connection that secures each guide to the transparent panel in a downwardly depending manner.

25. A sunshade roof construction as in claim 24 further including a headlining section associated with each guide, and a connection that secures each headlining section to the associated guide.

26. A sunshade roof construction as in claim 25 wherein the connections of each guide are detachable.

27. A sunshade roof construction as in claim 1 further including a fan for drawing heated air from between the sunshade and the transparent panel.

28. A sunshade roof construction as in claim 27 wherein the fan has an outlet that opens to the exterior of the vehicle.

29. A sunshade as in claim 27 which includes a solar panel for driving the fan.

30. For use with a roof covering an occupant compartment, a sunshade roof construction comprising: a transparent roof panel through which the environment can be viewed from the occupant compartment; a sunshade mounted below the transparent roof panel and including a plurality of laterally elongated blades each of which has opposite ends; said sunshade also including a flexible sheet-like shade that connects the blades; a pair of guides supported below the transparent panel with each guide receiving one end of each blade to support the sunshade for movement between: a closed position where the blades are spaced from each other below the transparent roof panel with the flexible shade extending between the blades to cooperate therewith in shading the occupant compartment from the transparent roof panel, and an open position where the blades are stored in a stacked relationship with all of the blades located in single vertical stack at a location that exposes the occupant compartment to the transparent roof panel with portions of the flexible shade folded between the stacked blades; a mechanism including at least one flexible drive tape having a permanent connection to the forwardmost blade of the sunshade; the flexible drive tape having apertures; the ends of the rearward blades each having at least one projection; each guide including a storage section that receives the blade ends in the single vertical stack; and each storage section including a ramp where the tape apertures receive the projections of the blade ends to maintain the blades spaced from each other during movement to and from and while in the closed position, and the blade end projections being withdrawn from the tape apertures at the ramps to permit the storage of the blades in the vertical stack with the portions of the flexible shade folded between the stacked blades.

31. For use with a vehicle including a roof covering an occupant compartment, a sunshade roof construction comprising: a transparent roof panel through which the environment can be viewed from the occupant compartment; a sunshade mounted below the transparent roof panel and including a plurality of laterally elongated blades each of which has opposite ends; said blade ends having drive projections; said sunshade also including a flexible sheet-like shade that connects the blades; a pair of guides supported below the transparent panel with each guide receiving one end of each blade to support the sunshade for movement between: a closed position where the blades are spaced from each other below the transparent roof panel with the flexible shade extending between the blades to cooperate therewith in shading the occupant compartment from the transparent roof panel, and an open position where the blades are stored in a stacked relationship with the flexible shade folded therebetween at a location that exposes the occupant compartment to the transparent roof panel; each guide including a storage section that receives the ends of the sunshade blades in the stacked relationship with the sunshade in the open position; a power operated drive mechanism including a pair of flexible drive tapes, a pair of sprockets associated with the drive tapes, and an electric motor for driving the sprockets; and said drive tapes having small apertures that mesh with the sprockets and also having large apertures that receive the drive projections of the blade ends to move the sunshade between the open and closed positions.

32. For use with a vehicle including a roof covering an occupant compartment, a sunshade roof construction comprising: a transparent roof panel through which the environment can be viewed from the occupant compartment; said transparent roof panel having a lower surface supported by the roof; a sunshade mounted below the transparent roof panel and including a plurality of laterally elongated blades each of which has opposite ends; said blade ends having drive projections; said sunshade also including a flexible sheet-like shade that connects the blades; a pair of guides supported by the lower surface of the transparent roof panel with each guide receiving one end of each blade to support the sunshade for movement between: a closed position where the blades are spaced from each other below the transparent roof panel with the flexible shade extending between the blades to cooperate therewith in shading the occupant compartment from the transparent roof panel, and an open position where the blades are stored in a stacked relationship with the flexible shade folded therebetween at a location that exposes the occupant compartment to the transparent roof panel; each guide including a storage section that receives the ends of the sunshade blades in the stacked relationship with the sunshade in the open position; and a power operated drive mechanism including a pair of flexible drive tapes, a pair of sprockets associated with the drive tapes, and an electric motor for driving the sprockets; and said drive tapes having small apertures that mesh with the sprockets and also having large apertures that receive the drive projections of the blade ends to move the sunshade between the open and closed positions.

* * * * *

UNITED STATES PATENT AND TRADEMARK OFFICE
CERTIFICATE OF CORRECTION

PATENT NO. : 4,923,244

DATED : May 8, 1990

INVENTOR(S) : Alain J-M Clenet

It is certified that error appears in the above-identified patent and that said Letters Patent is hereby corrected as shown below:

Column 7, Line 67 (Appln. Page 16, Line 1), after "located" and before "a" insert --at--.

Column 8, Lines 4 and 5 (Appln. Page 16, Line 6), after "suitable" insert --manner--.

Column 13, Line 50, Claim 13 (Amendment Dated October 18, 1989, Page 5, Line 7, Claim 13), before "connect" delete "to" (second occurrence).

Signed and Sealed this

Fourth Day of February, 1992

Attest:

HARRY F. MANBECK, JR.

Attesting Officer

Commissioner of Patents and Trademarks